(12) United States Patent
Chengalvala (10) Patent No.: US 12,238,089 B2
(45) Date of Patent: Feb. 25, 2025

(54) VEHICLE NETWORK SECURITY

(71) Applicant: Ford Global Technologies, LLC, Dearborn, MI (US)

(72) Inventor: Venkata Maruthe Ravikumara Sharma Chengalvala, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 17/823,126

(22) Filed: Aug. 30, 2022

(65) Prior Publication Data
US 2024/0073201 A1    Feb. 29, 2024

(51) Int. Cl.
*H04L 9/40*        (2022.01)
(52) U.S. Cl.
CPC ...... *H04L 63/0838* (2013.01); *H04L 63/1416* (2013.01)
(58) Field of Classification Search
USPC ............................................................ 726/7
See application file for complete search history.

(56) References Cited

U.S. PATENT DOCUMENTS

| | | | |
|---|---|---|---|
| 10,218,499 B1* | 2/2019 | El Idrissi | G06F 21/44 |
| 10,785,287 B2* | 9/2020 | Prakash | H04L 67/01 |
| 11,212,080 B2 | 12/2021 | Takemori et al. | |
| 11,804,962 B2* | 10/2023 | Bond | H04L 9/0897 |
| 2009/0091185 A1* | 4/2009 | Konno | B60R 25/04 |
| | | | 307/10.5 |
| 2019/0068361 A1* | 2/2019 | Ye | H04W 4/48 |

* cited by examiner

*Primary Examiner* — Sanchit K Sarker
(74) *Attorney, Agent, or Firm* — Kristopher Storms; Brooks Kushman P.C.

(57) ABSTRACT

In response to detecting a trigger event a computer in a vehicle such as a gateway device can retrieve a static identifier of an electronic control unit (ECU) via a vehicle network. The vehicle in the computer can then receive, in response to a request to a server computer, a salt string, and generate a temporary ECU identifier for the ECU based on the salt string and the static identifier. The temporary ECU identifier can then be deployed to the vehicle network.

20 Claims, 6 Drawing Sheets

VEHICLE NETWORK SECURITY

BACKGROUND

Modern vehicles typically include multiple electronic devices. For example, vehicles typically include multiple computing devices such as electronic control units (ECUs) or the like. The computing devices may communicate with one another and/or with other vehicle devices, e.g., vehicle sensors, via one or more vehicle communication networks. For example, ECUs in a vehicle may communicate via a controller area network (CAN) bus and/or an ethernet network. Further, some computing devices in a vehicle may communicate via an in-vehicle network such as one of the foregoing, as well as via a wide area network to communicate with remote or "cloud" servers.

DETAILED DESCRIPTION

Figure 1:
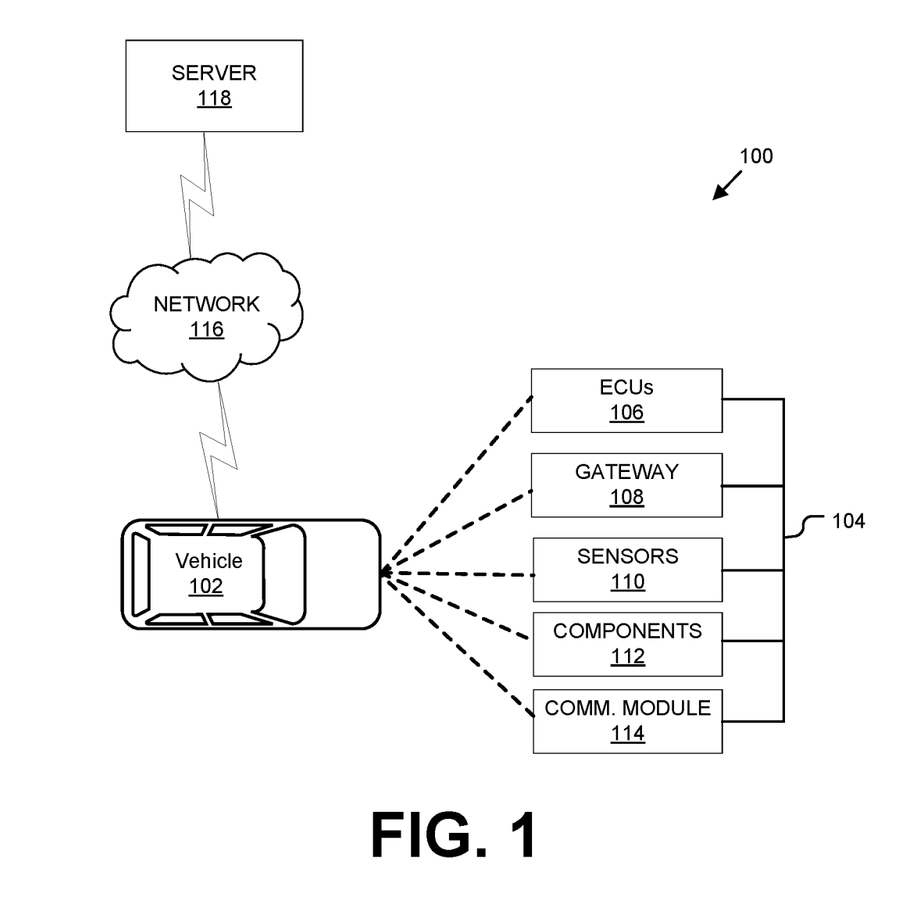
FIG. 1 is a block diagram of a vehicle network 104 security system.
Figure 2:
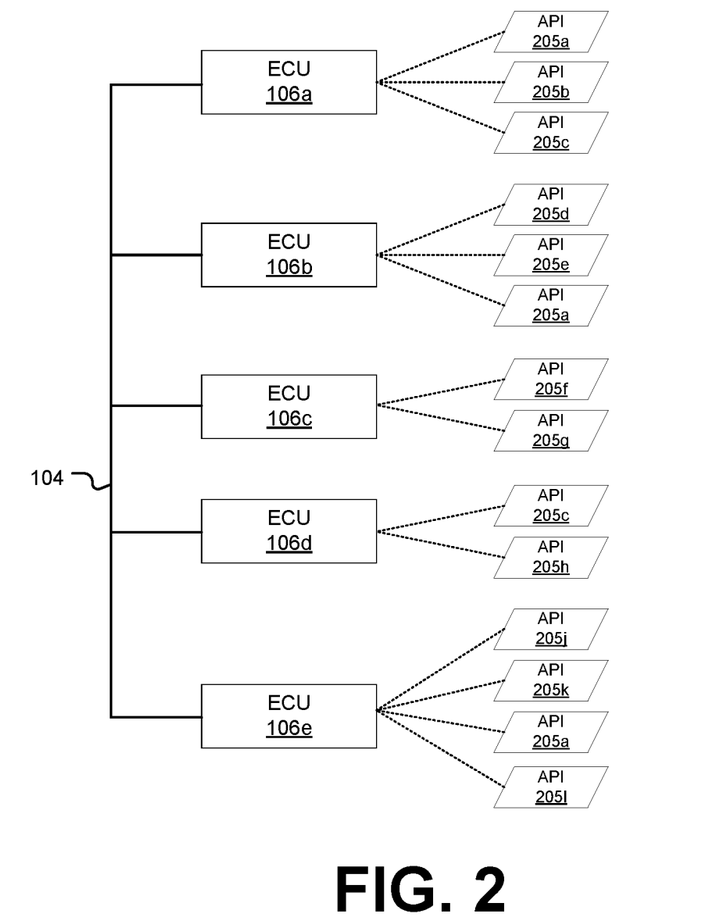
FIG. 2 is a block diagram illustrating vehicle ECUs including APIs on a vehicle network 104.

Referring to FIGS. 1 and 2, in an exemplary implementation, a plurality of ECUs 106 are connected to a vehicle network 104. Further, respective ECUs 106 may include one or more application programming interfaces (APIs). Access to and/or communications on the vehicle network 104, including with respect to the ECUs 106 and/or APIs 200, may be controlled by a gateway device 108 computer, sometimes referred to as a network gateway. The present disclosure includes techniques for enhancing security in vehicle 102 computing devices, including ECUs 106 and/or APIs 200 included in one or more ECUs 106. Various hardware and/or software modules in a vehicle 102, i.e., vehicle 102 computing modules such as ECUs 106 and APIs 200, may be identified by static identifiers, i.e., identifiers that typically do not change over time, e.g., from one vehicle 102 ignition cycle to the next. Techniques disclosed herein can generate a temporary identifier for a vehicle 102 computing module so that an identifier for the computing module at a first time is not the same as an identifier for the computing module at a second time. Vehicle network 104 security thus may be enhanced in several ways. For example, an attacker may find it difficult or impossible to guess or deduce the temporary identifier. Moreover, use of the temporary identifier for only a limited period of time makes deducing or guessing the temporary identifier even more difficult for a would-be attacker. Further, in the extremely unlikely event that a temporary identifier were guessed or deduced, an attacker would have only the limited time of the temporary identifier to attempt to exploit it.

A system comprises a gateway device connectable to a vehicle network and including a processor and a memory, wherein the processor is programmed to: in response to detecting a trigger event, retrieve a static identifier of an electronic control unit (ECU) via the vehicle network; receive, in response to a request to a server computer, a salt string; generate a temporary ECU identifier for the ECU based on the salt string and the static identifier; and deploy the temporary ECU identifier to the vehicle network.

The gateway device can be further programmed to, in response to detecting the trigger event, request and receive a second salt string from the server computer or a second server computer; generate a temporary application programming interface (API) identifier for an API included in the ECU based on the temporary ECU identifier and the second salt string; and deploy the temporary API identifier to the vehicle network. The API can be included in the ECU and a second ECU. The second ECU can be a sub-ECU of the ECU.

The request to the server computer can include the static identifier of the ECU. The request to the server computer can include the static identifier of the ECU and at least one second ECU. The can be further programmed to receive at least one second salt string for at least one second ECU in response to the request. The request to the server can include a vehicle identifier addition to the static identifier of the ECU.

The ECU can be one of a plurality of ECUs in the vehicle and the gateway device can be further programmed to generate respective temporary ECU identifiers for respective ECUs in the plurality of ECUs.

The gateway device can be further programmed to determine that a duration of the temporary ECU identifier has expired; obtain a second salt string; generate a new temporary ECU identifier based on the second salt string; and update the temporary ECU identifier with the new temporary ECU identifier.

The can be an ignition ON event.

The gateway device can be further programmed to generate the temporary ECU identifier upon detecting a second trigger event.

The system can further comprise the server computer, wherein the server computer includes a processor and a memory and is programmed to: in response to receiving the request, generate the salt string and send the salt string to the computer gateway device in the vehicle. The server computer can be further programmed to receive the temporary ECU identifier from the gateway device and store the temporary ECU identifier. The server computer can be further programmed to include the temporary ECU identifier in a request to access the ECU.

A method comprises, in response to detecting a trigger event, retrieving a static identifier of an electronic control unit (ECU) via a vehicle network; receiving, in response to a request to a server computer, a salt string; generating a temporary ECU identifier for the ECU based on the salt string and the static identifier; and deploying the temporary ECU identifier to the vehicle network.

The method can further comprise, in response to detecting the trigger event, requesting and receiving a second salt string from the server computer or a second server computer; generating a temporary application programming interface (API) identifier for an API included in the ECU based on the temporary ECU identifier and the second salt string; and deploying the temporary API identifier to the vehicle network.

The ECU can be one of a plurality of ECUs in the vehicle, the method further comprising generating respective temporary ECU identifiers for respective ECUs in the plurality of ECUs.

The method can further comprise determining that a duration of the temporary ECU identifier has expired; obtaining a second salt string; generating a new temporary ECU identifier based on the second salt string; and updating the temporary ECU identifier with the new temporary ECU identifier. The method can further comprise generating the temporary ECU identifier upon detecting a second trigger event.

FIG. 1 is a block diagram of a vehicle network security system 100. A vehicle 102 in the context of this disclosure may be any suitable vehicle, e.g., a passenger or commercial automobile such as a sedan, a coupe, a truck, a sport utility, a crossover, a van, a minivan, a taxi, a bus, etc. Further, although this disclosure describes ground vehicles 102, the systems and methods could likewise be implemented with respect to water or air vehicles 102.

A vehicle 102 includes a vehicle network 104, i.e., a digital or packet network via which messages may be exchanged between various devices in vehicle 102, such as the gateway device 108 and/or ECUs 106, sensors 110, actuators, components 112, a communications module, etc. In cases in which computing device such as the gateway device 108 or an ECU 106 actually comprises a plurality of devices, the vehicle network 104 could be used for communications between such devices.

In example implementations, a vehicle network 104 can include a controller area network (CAN) in which messages are conveyed via a CAN bus, and/or a local interconnect network (LIN) in which messages are conveyed via a LIN bus. The vehicle network 104 further may alternatively or additionally include an Ethernet network. For example, the gateway device 108 could be a gateway device 108 managing messages between a remote server 118 and devices in the vehicle 102 such as ECUs 106 communicating via a CAN bus and/or Ethernet. Yet further, in some implementations, the vehicle network 104 could include a network in which messages are conveyed using other wired communication technologies and/or wireless communication technologies e.g., WiFi®, Bluetooth®, etc. Additional examples of protocols that may be used for communications over vehicle network 104 in some implementations include, without limitation, Media Oriented System Transport MOST, Time-Triggered Protocol TTP, and FlexRay.

As will be clear, in some implementations, vehicle network 104 could represent a combination of multiple networks, possibly of different types, that support communications among devices in vehicle 102. For example, vehicle network 104 can include a CAN in which some devices in vehicle 102 communicate via a CAN bus, and a wired or wireless local area network in which some device in vehicle 102 communicate according to Ethernet or Wi-Fi communication protocols.

The ECUs 106 and the gateway device 108 are respective computing devices, which each include a processor and a memory. The memory includes one or more forms of computer readable media, and stores instructions executable by the respective computing device for performing various operations, including as disclosed herein. For example, a computing device can be a generic computer with a processor and memory as described above and/or may include an ECU 106 or gateway device 108 for a specific function or set of functions, and/or a dedicated electronic circuit including an ASIC (application specific integrated circuit) that is manufactured for a particular operation, e.g., an ASIC for processing sensor 110 data and/or communicating the sensor 110 data. In another example, a vehicle 102 computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 112 inside an FPGA may be configured based on VHDL programming, e.g. stored in a memory electrically connected to the FPGA circuit. In some examples, a combination of processor(s), ASIC(s), and/or FPGA circuits may be included in a computing device.

The memory of a computing device can be of any suitable type, e.g., hard disk drives, solid state drives, servers 118, or any volatile or non-volatile media. The memory can store program instructions, various data such as static identifiers or the like as discussed further below, and/or collected data sent from vehicle sensors 110. The memory can be a separate device from the computing device, and the computing device can retrieve information stored by the memory via a network in the vehicle 102, e.g., over a CAN bus, a wireless network, etc. Alternatively or additionally, the memory can be part of the computing device.

A computing device, e.g., an ECU 106, may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer, as opposed to a human operator, is to control such operations. Additionally, a computing device in the vehicle 102 may be programmed to determine whether and when a human operator is to control such operations.

The gateway device 108 allows devices on the vehicle network 104, such as ECUs 106, to communicate with devices external to the vehicle network 104, such a server 118 communicating with the vehicle 102 via the wide area network 116. As such, the gateway device 108 is a computing device as described above. The gateway can send messages to and from vehicle 102 devices such as the ECUs 106 via the vehicle network 104, and can actuate the communication module 114 to send messages to and from devices outside the vehicle 102 such as a server 118.

A vehicle 102 typically includes a variety of sensors 110 that provide data on the vehicle network 104. A sensor 110 is a device that can obtain one or more measurements of one or more physical phenomena. Example vehicle 102 sensors 110 could include cameras, short range radar, long range radar, LIDAR, and/or ultrasonic transducers, weight sensors 110, accelerometers, motion detectors, etc., i.e., sensors 110 to provide a variety of data. To provide just a few non-limiting examples, sensor 110 data could include data for determining a position of a component 112, a location of an object, a speed of an object, a type of an object, a slope of a roadway, a temperature, a presence or amount of moisture, a fuel level, a data rate, etc.

ECUs 106 and the like may include programming to command one or more actuators to operate one or more vehicle 102 subsystems or components 112, such as vehicle 102 brakes, propulsion, or steering. That is, an ECU 106 may actuate control of acceleration in the vehicle 102 by controlling one or more of an internal combustion engine, electric motor, hybrid engine, etc., and/or may actuate control of brakes, steering, climate control, interior and/or exterior lights, etc.

As seen in FIG. 2, various ECUs 106 can include one or more APIs 200. An API 200 is a set of computer program instructions that allow one computer to interface, i.e., receive requests and/or data from and/or send requests and/or data to, another computer. Vehicle 102 ECUs 106 can be provided to allow another computer to request various operations and/or data, such as telemetry data (e.g., location, speed, ignition status, diagnostic data, etc., of a vehicle 102), disabling or enabling a propulsion, notification that a vehicle 102 security system 100 is breached, access to and control of a vehicle network 104 such as a Wi-Fi network, etc. ECUs 106 are collectively referred to herein as ECUs 106, but in FIG. 2 ECUs 106a-106e are separately labeled to illustrate different ones of various ECUs 106. Likewise, APIs 200 are collectively referred to herein as APIs 200, but in FIG. 2 APIS 200a-200l are separately labeled to illustrate separate APIs 200 in the various ECUs 106. Note that an API 200 can be duplicated or distributed in respective ECUs 106. For example, an API 200 to support autonomous or semi-autonomous operations that include control of steering as well as speed could be distributed among multiple ECUs 106. Further, scenarios are possible in which a first API 200 accesses a second API 200, e.g., the first API 200 includes programming to call a function of the second API 200.

Figure 3:
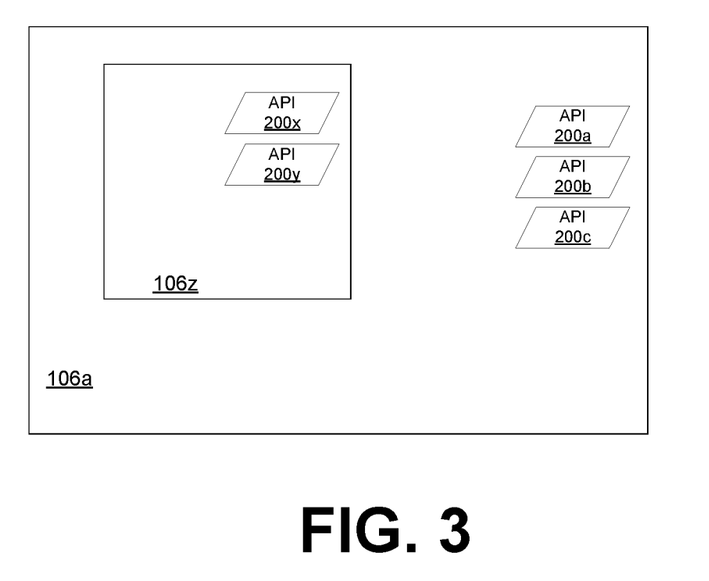
FIG. 3 is a block diagram illustrating a vehicle ECU including a sub-ECU.

Yet further, as illustrated in FIG. 3, a first ECU 106z, which could be referred to as a sub-ECU, could be included in a second ECU 106a that includes APIs 200a, 200b, 200c. The sub-ECUz could include its own set of APIs 200x, 200y.

The gateway device 108 (and possibly other vehicle 102 computing devices) may be configured for communicating via communication module 114 or interface with devices outside of the vehicle 102, e.g., through vehicle 102 to vehicle 102 (V2V), vehicle-to-infrastructure or everything (V2X), vehicle-to-everything including cellular communications (C-V2X), to another vehicle 102, to an infrastructure element, typically via direct radio frequency communications, and/or, typically via the wide area network 116, to one or more remote servers 118. The communication module 114 could include one or more mechanisms by which the computers of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the communication module 114, e.g., for communicating with a server 118, can include cellular, Bluetooth, IEEE 802.11, dedicated short range communications (DSRC), cellular V2X (CV2X), MQTT, gRPC, and the like.

The wide area network 116 can include one or more mechanisms by which the communication module 114 may communicate with, for example, a remote server 118. Accordingly, the wide area network 116 can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, V2V, V2X, CV2X, DSRC, local area networks LAN, and/or the Internet.

The remote server 118 is a computing device such as described above. Sometimes the remote server 118 may be referred to as a "cloud" server because it is remote from the vehicle 102 and accessed via the wide area network 116.

As noted above, the gateway device 108 is connectable to the vehicle network 104 to communicate with other devices such as ECUs 106 on the vehicle network 104. The gateway device 108 may generate temporary identifiers for ECUs 106 and/or APIs 200 in response to detecting a trigger event on the vehicle network 104. For example, a vehicle network 104 may broadcast an ignition ON event to devices in a vehicle 102. In another example, as discussed below, a trigger event could be an expiration of the time duration. In yet another example, a trigger event could be user input to access an application via a user device connected to a vehicle computer or via a human machine interface (HMI) in the vehicle, e.g., by providing input via a microphone or touch screen. Upon receiving the user input, a vehicle computer could determine that one or more APIs 200 located in one or more ECUs 106 will need to be accessed. Such user input could be received even when a vehicle is in an ignition off state, e.g., when a user is triggering an over the air software update, for example. In yet another example, a trigger event could be a computer in the vehicle such as the gateway device 108 receiving a wake-up message, e.g., using a simple message service (SMS).

Upon detecting the trigger event, e.g., the ignition ON event, the gateway can retrieve respective static identifiers of one or more electronic control units (ECU) via the vehicle network 104. For example, the static identifier of an ECU 106 could be in electronic serial number (ESN) or the like that identifies the ECU 106 on the vehicle network 104. The gateway could maintain a table or the like of ECUs 106 and respective identifiers. Alternatively or additionally, ECUs 106 could identify themselves to the gateway on the vehicle network 104, e.g., in response to a network wake up and/or vehicle 102 ignition ON event. ECUs 106 can then be accessed via the vehicle network 104 according to their respective identifiers. These identifiers are referred to as static identifiers because they typically are stored in read-only memory and do not change. Likewise, respective APIs 200 may have static identifiers stored in a table or the like of the gateway device 108.

By actuating the vehicle 102 communication module 114, the gateway device 108 can be in communication with a remote server 118 computer via a wide area network 116. Upon identifying one or more ECU static identifiers, the gateway device 108 can request the remote server 118 to provide a salt string. A salt string is a randomly or pseudo-randomly generated string that can be combined or concatenated with, e.g., prepended or appended to, another string. In examples herein, respective salt strings are prepended or appended to ECU static identifiers. The server 118 can return one or more requested salt strings to the gateway device 108 in response to a request from the gateway device 108. Upon receiving the one or more salt strings, the gateway device 108 can then generate respective temporary ECU identifiers based on the salt string and the static identifier for the respective ECU 106. For example, the salt string and the ECU static identifier can be concatenated, e.g., the salt string can be appended to the ECU static identifier. The gateway device 108 may perform further processing to enhance the security of the temporary ECU identifier. For example, hashing using a suitable algorithm, such as SHA256/512, can be applied to further transform and obscure the temporary ECU identifier, and to make the temporary ECU identifier even more difficult for an attacker to reverse-engineer, guess, or deduce. The temporary ECU identifier can then be deployed to the vehicle network 104. That is, the gateway device 108 can store a table or the like of temporary ECU identifiers associated with respective ECUs 106 in the table or the like that indicates static ECU 106 identifiers. Then, upon receiving a request from a device external to the vehicle 102, e.g., from a server 118 or from a user device such as a smart phone or the like that has received a temporary identifier from the server 118, gateway device 108 can allow access to the respective ECU 106.

The gateway device 108 may further generate one or more temporary API 200 identifiers. For example, in response to detecting the trigger event, the gateway device 108 may request and receive one or more second salt strings from the server 118 computer or a second server 118 computer. Upon receiving a salt string for an API 200, the gateway device 108 may then generate a temporary application programming interface (API) identifier for an API 200 included in an ECU 106 based on the temporary ECU identifier for that ECU 106, and the second salt string. The gateway device 108 can then deploy the temporary API 200 identifier to the vehicle network 104, e.g., as described above for deploying temporary ECU identifiers.

A request from the gateway device 108 to a server 118 for a salt string typically includes a vehicle 102 identifier, e.g., a Vehicle 102 Identification Number (VIN), and respective static identifiers of one or more ECUs 106. The server 118 could then store the received static identifiers in association with the vehicle 102 identifier. Further, the gateway device 108 can provide generated temporary identifiers for ECUs 106 and/or APIs 200 to the server 118 along with the vehicle 102 identifier and respective static identifiers so that the server 118 can then store temporary identifiers for accessing the respective ECUs 106 and/or APIs 200. For example, the server 118 could access vehicle 102 telematics data, e.g., request a vehicle 102 speed or location, with a temporary identifier for a vehicle 102 ECU 106. In another nonlimiting example, the server 118 could access a vehicle 102 Wi-Fi network with a temporary identifier for a vehicle 102 API 200.

In examples in which a second ECU 106 is a sub-ECU of a first ECU 106, a temporary identifier for the second ECU 106 could be a concatenation of a temporary identifier for the first ECU 106 and a salt string obtained for the second ECU 106. Similarly, in examples in which an API 200 is included in more than one ECU 106, e.g., a first ECU 106 and a second ECU 106, a temporary identifier for that ECU 106 could be a concatenation of temporary identifiers for the first and second ECU 106 and the salt string obtained for the API 200.

In some examples, a duration of a temporary ECU identifier or temporary API 200 identifier can depend on detecting a second trigger event. For example, the second trigger event could be a vehicle 102 ignition OFF event. However, a second trigger event could alternatively or additionally be an expiration of a specified time period for which the temporary identifier is valid. The gateway device 108 could be programmed to detect expiration of such time period. In response to detecting the expiration of a duration of a temporary identifier, the gateway device 108 could then generate a second salt string for the respective ECU 106 and/or API 200, and then generate a new or second temporary ECU identifier based on the second salt string, e.g., by concatenating a static identifier and the second salt string as described above. The temporary ECU 106 or API 200 identifier can then be replaced or updated with the new temporary identifier.

Figure 4:
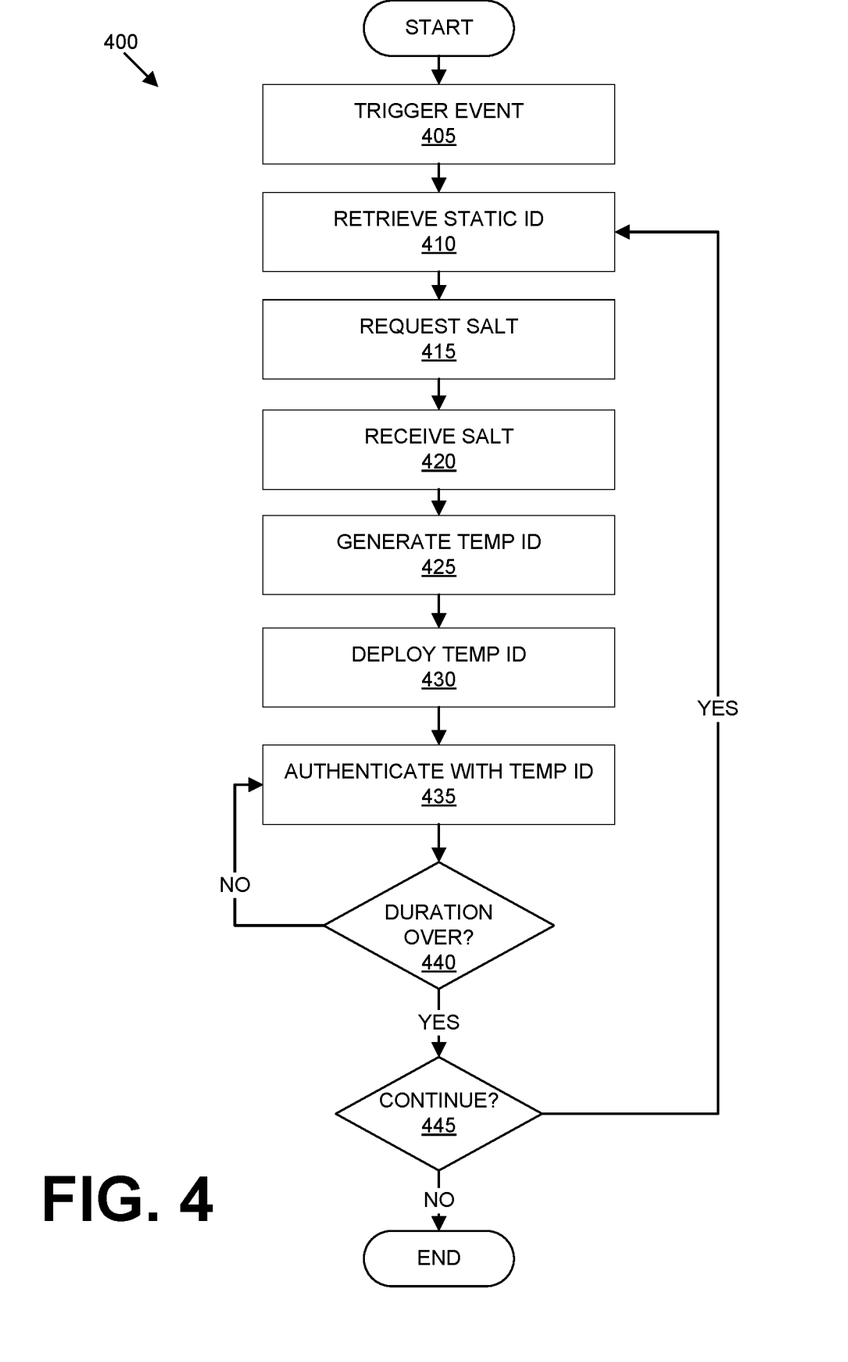
FIG. 4 is a process flow diagram illustrating an example process for generating a temporary ECU identifier.

FIG. 4 is a process flow diagram illustrating an example process 400 for generating a temporary ECU identifier. The process 400 begins in a block 405, in which a gateway device 108 detects a trigger event, e.g., a vehicle 102 ignition ON.

Next, in a block 410, the gateway device 108 retrieves static identifiers for one or more ECUs 106 in the vehicle 102. For example, the gateway device 108 could store the static identifiers in a memory, e.g. in a table or the like, and/or could detect static identifiers communicated on a vehicle network 104 in response to the trigger event.

Next, in a block 415, the gateway device 108 sends a request to a server 118 for one or more salt strings for respective ECUs 106 in the vehicle 102. As noted above, the gateway device 108 may also include a vehicle 102 identifier and the respective ECU static identifiers in sending the request. In some implementations, the gateway device 108 may request salt strings for multiple ECUs 106 in one message to the server 118. In other implementations, the gateway device 108 may request salt strings for respective ECUs 106 in different respective messages to the server 118. Requesting salt strings for multiple ECUs 106 in a single message can provide efficiency, e.g., the single message may consume less bandwidth and/or obtain a response in less time than multiple messages. On the other hand, multiple messages may be more secure, e.g., if one of multiple messages is compromised, only one and not all salt strings will be compromised.

Next, in a block 420, the gateway device 108 receives the requested one or more salt strings from the server 118. Note that examples are possible in which the server 118 further generates one or more temporary ECU identifiers, and provides the identifiers in addition to or instead of the salt strings. Yet further, notes that examples are possible in which the server 118 generate salt strings and/or temporary ECU identifiers for possible future use by the gateway device 108. For example, a message sent in the block 415 could request a salt string and/or temporary identifier for an ECU 106, and could then store the salt string and/or temporary identifier in a memory for a predetermined period of time, e.g., a number of hours, and could then use the salt string to generate a temporary identifier and/or deploy the temporary identifier if the predetermined period of time had not expired. Put another way, salt strings and/or temporary identifiers could be pre-fetched. Salt strings that are pre-fetched could then be stored in a memory, e.g., of the gateway device 108, and then used to generate ECU identifiers as described with respect to the block 425, upon the gateway device 108 detecting a second trigger event. Alternatively or additionally, temporary identifiers that are pre-fetched could be stored in a memory of a gateway device, and then deployed based on a second trigger event as described below with respect to the block 430. For example, a first trigger event could be a vehicle achieving and ignition on state, and a second trigger event could be a user input requiring an ECU 106 and/or API 200, as described above.

Next, in a block 425, the gateway device 108 generate respective temporary ECU identifiers for the ECUs 106. The block 425 may be omitted in implementations in which the server 118 generate temporary ECU identifiers.

Next, in a block 430, the gateway device 108 deploys the generated one or more temporary ECU identifiers. As explained above, the gateway device 108 may store the temporary ECU identifiers in association with respective static identifiers. Further, the gateway device 108 may provide temporary ECU identifiers to the server 118 in association with the respective static ECU 106 identifiers.

The server 118 may then use the temporary ECU identifiers to access the respective ECUs 106. Further, in examples in which a new or second temporary ECU identifier may be generated, e.g., because a first period of time for a temporary identifier has expired, the block 430 may include updating a temporary ECU identifier with a new or second temporary ECU identifier that has most recently been generated in the block 425.

Next, in a block 435, the one or more temporary ECU identifiers can be used on the vehicle network 104. That is, when the gateway device 108 receives requests from a remote server 118 to access a vehicle 102 ECU 106, the gateway device 108 can authenticate the remote server 118 according to the temporary ECU identifier. Further, the gateway device 108 may decline to authenticate a request for a vehicle 102 ECU 106 using a static ECU 106 identifier rather than the temporary ECU identifier.

In a block 440, the gateway device 108 may determine whether a duration for one or more temporary ECU identifiers has expired. As noted above, in some examples, the duration may be defined according to a time from a vehicle 102 ignition ON event to a vehicle 102 ignition OFF event. However, the duration could also be defined for a period of time, e.g., a number of minutes or hours. If the duration has not expired, then the process 400 can return to the block 435. However, if the duration has expired, then a block 445 may be executed next.

In the block 445, the gateway device 108 may determine whether to continue the process 400. For example, if the duration has expired because of the vehicle 102 ignition OFF event, the process 400 may end following the block 445. Otherwise, the process 400 may return to the block 410 to generate one or more new or second ECU 106 identifiers.

Figure 5:
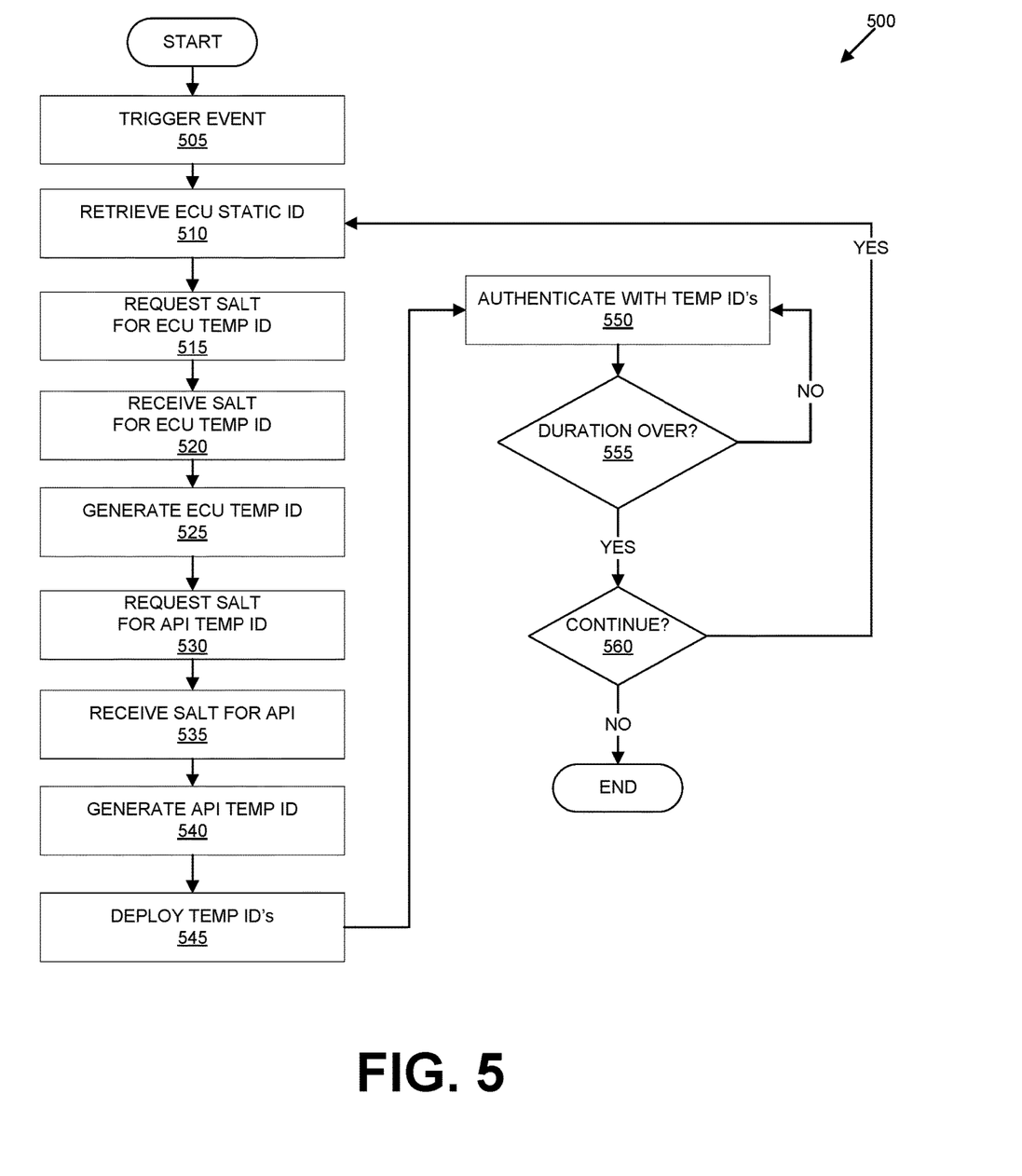
FIG. 5 is a process flow diagram illustrating an example process for generating a temporary ECU identifier and a temporary API identifier.

FIG. 5 is a process flow diagram illustrating an example process 500 for generating a temporary ECU identifier and a temporary API 200 identifier. The blocks 505-525 are the same as the blocks 405-425 of the process 400, and therefore the blocks 505-525 will not be separately described to avoid repetition.

Following the block 525, in a block 530, the gateway device 108 sends a request to a server 118, typically the same server 118 as in the blocks 515, 520, for respective salt strings for APIs 200 in ECUs 106. The gateway device 108 may store a list of static identifiers for the APIs 200 as described above. The static identifiers for the APIs 200 may be included in the request, along with a vehicle 102 identifier. In some implementations, the gateway device 108 may request salt strings for multiple APIs 200 in one message to the server 118, and may further request salt strings for multiple ECUs 106 in such message. In other implementations, the gateway device 108 may request salt strings for respective ECUs 106 and/or APIs 200 in different respective messages to the server 118. Moreover, salt strings and/or temporary identifiers for APIs 200 could be pre-fetched and could be generated and/or deployed based on a second trigger event, as described above with respect to ECUs 106.

In a block 535, following the block 530, the gateway device 108 receives one or more salt strings for the respective APIs 200. Note that examples are possible in which the server 118 further generates one or more temporary API identifiers, and provides the identifiers in addition to or instead of the salt strings.

In a block 540, the gateway device 108 generates temporary API 200 identifiers as described above, i.e., concatenating a salt string with a temporary ECU identifier and/or the static API 200 identifier. The block 540 may be omitted in implementations in which the server 118 generate temporary ECU identifiers.

In a block 545, one or more temporary ECU identifiers and temporary API 200 identifiers are deployed, e.g., as described above with respect to the block 430.

In the block 550, the temporary ECU identifiers and/or temporary API 200 identifiers can be used in the vehicle 102 for authentication of external devices such as the server 118 requesting access via the vehicle network 104 to ECUs 106 and/or APIs 200, as described above.

The blocks 555, 560 are similar to the blocks 440, 445, and therefore will not be further described to avoid repetition, other than to note that, following the block 555, the process 500 returns to the block 550 if a duration for temporary identifiers has not been exceeded, and may otherwise proceed to the block 560. Further, the process 500 returns to the block 510 following the block 560 if the process 500 is to continue. Otherwise, the process 500 may end following the process 560.

Figure 6:
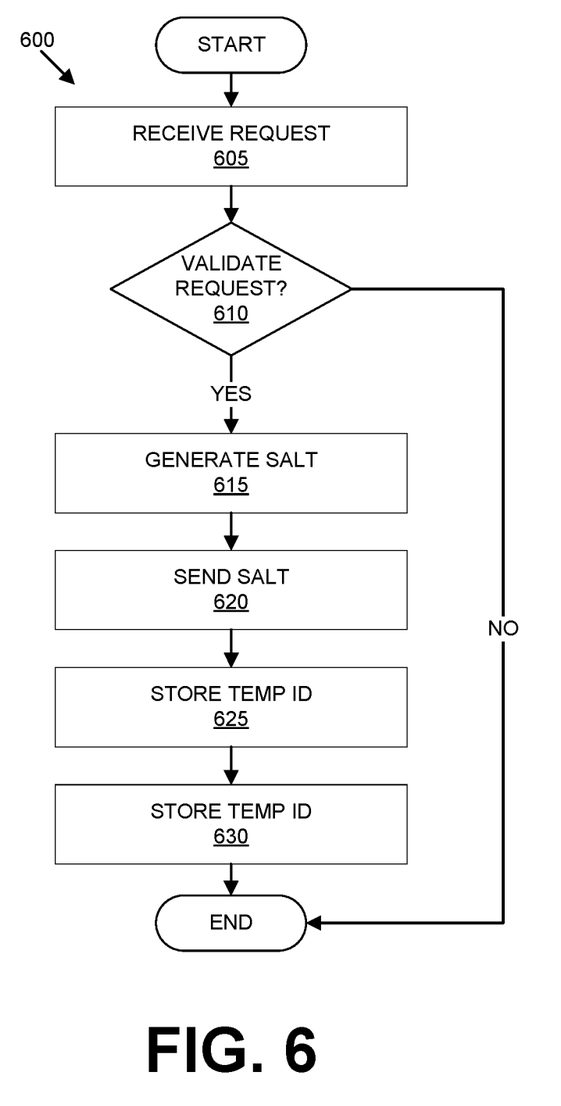
FIG. 6 is a process flow diagram illustrating an example process for a remote server to generate salt strings and use temporary identifiers.

FIG. 6 is a process flow diagram illustrating an example process 600 for a remote server 118 to generate salt strings and use temporary identifiers. The process 600 begins in a block 605, in which the server 118 receives a request from a gateway device 108 in a vehicle 102 to provide one or more salt strings for ECUs 106 and/or APIs 200 in the vehicle 102. The request can include a vehicle 102 identifier and/or static identifiers, as explained above.

In a block 610, following the block 605, the server 118 can validate the request. For example, the gateway device 108 could provide an encryption key or the like, and the server 118 could validate the request from the gateway device 108 using any suitable authentication technique. If the request cannot be validated, then the process 600 could be terminated. Otherwise, the process 600 and proceed to a block 615.

In the block 615, the server 118 can generate the requested salt string(s). For example, the request could specify a requested length of a salt string and/or the server 118 could be programmed to generate a string of a certain number of bits or bites, for example. The salt string could be generated using any suitable technique for generating a random or pseudo-random string. A salt string is typically generated for a specific ECU 106 or API 200 so that a salt string is not used for temporary identifiers for multiple ECUs 106 or APIs 200, thereby providing further enhanced security.

In a block 620, following the block 615, the server 118 sends the requested salt string(s) to the requesting gateway device 108.

In a block 625, the server 118 receives one or more temporary ECU 106 and/or API 200 identifiers generated with the salt string(s) sent in the block 620, and stores them in a memory.

Then, in a block 630, the server 118 can use the stored temporary identifier(s) to access ECUs 106 and/or APIs 200 in the vehicle 102 via the gateway device 108. For example, the server 118 could include programming to request data from the vehicle 102 relating to vehicle 102 speed, location, etc. In another example, the server 118 could include programming to accept requests from a user device such as a smart phone or the like, to control the vehicle 102, e.g., unlocked doors, activate or deactivate a propulsion, etc.

Following the block 630, the process 600 can end.

The computing devices discussed herein include processors and memories as stated above. The memories generally including instructions executable by one or more of the computing devices' processors, such as instructions disclosed in the foregoing, and instructions for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby causing one or more actions and/or processes to occur, including one or more of the processes described herein. Such instructions and other data may be stored and transmitted using a variety of computer readable media. A file in the computer is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying Figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a gateway device connectable to a vehicle network and including a processor and a memory, wherein the processor is programmed to:
   in response to detecting a trigger event, retrieve a static identifier of an electronic control unit (ECU) via the vehicle network;
   receive, in response to a request to a server computer, a salt string;
   further in response to detecting the trigger event, request and receive a second salt string from the server computer or a second server computer;
   generate a temporary ECU identifier for the ECU based on the salt string and the static identifier;
   generate a temporary application programming interface (API) identifier for an API included in the ECU based on the temporary ECU identifier and the second salt string;
   deploy the temporary ECU identifier to the vehicle network; and
   deploy the temporary API identifier to the vehicle network;
   wherein the ECU is one of a plurality of ECUs in the vehicle and the gateway device is further programmed to generate respective temporary ECU identifiers for respective ECUs in the plurality of ECUs.

2. The system of claim 1, wherein the API is included in the ECU and a second ECU.

3. The system of claim 2, wherein the second ECU is a sub-ECU of the ECU.

4. The system of claim 1, wherein the request to the server computer includes the static identifier of the ECU.

5. The system of claim 4, wherein the request to the server computer includes the static identifier of the ECU and at least one second ECU.

6. The system of claim 4, wherein the request to the server includes a vehicle identifier addition to the static identifier of the ECU.

7. The system of claim 1, wherein the gateway device is further programmed to receive at least one second salt string for at least one second ECU in response to the request.

8. The system of claim 1, wherein the gateway device is further programmed to:
   determine that a duration of the temporary ECU identifier has expired;
   obtain the second salt string;
   generate a new temporary ECU identifier based on the second salt string; and
   update the temporary ECU identifier with the new temporary ECU identifier.

9. The system of claim 8, wherein the server computer is further programmed to receive the temporary ECU identifier from the gateway device and store the temporary ECU identifier.

10. The system of claim 1, wherein the trigger is an ignition ON event.

11. The system of claim 10, wherein the server computer is further programmed to include the temporary ECU identifier in a request to access the ECU.

12. The system of claim 1, wherein the gateway device is further programmed to generate the temporary ECU identifier upon detecting a second trigger event.

13. The system of claim 1, further comprising the server computer, wherein the server computer includes a processor and a memory and is programmed to:

in response to receiving the request, generate the salt string and send the salt string to the computer gateway device in the vehicle.

14. The system of claim 1, wherein generating the temporary API identifier includes concatenating the second salt string with the temporary ECU identifier.

15. A method, comprising:
in response to detecting a trigger event, retrieving a static identifier of an electronic control unit (ECU) via a vehicle network;
receiving, in response to a request to a server computer, a salt string;
further in response to detecting the trigger event, requesting and receiving a second salt string from the server computer or a second server computer;
generating a temporary ECU identifier for the ECU based on the salt string and the static identifier;
generating a temporary application programming interface (API) identifier for an API included in the ECU based on the temporary ECU identifier and the second salt string;
deploying the temporary ECU identifier to the vehicle network; and
deploying the temporary API identifier to the vehicle network;
wherein the ECU is one of a plurality of ECUs in the vehicle, the method further comprising generating respective temporary ECU identifiers for respective ECUs in the plurality of ECUs.

16. The method of claim 15, further comprising:
determining that a duration of the temporary ECU identifier has expired;
obtaining the second salt string;
generating a new temporary ECU identifier based on the second salt string; and
updating the temporary ECU identifier with the new temporary ECU identifier.

17. The method of claim 15, further comprising generating the temporary ECU identifier upon detecting a second trigger event.

18. The method of claim 15, wherein generating the temporary API identifier includes concatenating the second salt string with the temporary ECU identifier.

19. The method of claim 15, further comprising, in response to receiving the request in a server computer, generating the salt string in the server computer and sending the salt string to a gateway device on the vehicle network.

20. The method of claim 19, further comprising, in the server computer, receiving the temporary ECU identifier from the gateway device and storing the temporary ECU identifier.

* * * * *